(12) United States Patent
Kimura et al.

(10) Patent No.: US 6,222,798 B1
(45) Date of Patent: Apr. 24, 2001

(54) TRACK JUMP FOR OPTICAL INFORMATION RECORDING AND REPRODUCING METHOD AND DEVICE

(75) Inventors: Yasuyuki Kimura, Hiki-gun; Susumu Kojima, Sakado; Kazuo Noda, Yokohama, all of (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/129,043

(22) Filed: Aug. 4, 1998

(30) Foreign Application Priority Data

Aug. 8, 1997 (JP) .................................................. 9-214757

(51) Int. Cl.⁷ .................................................. G11B 17/22
(52) U.S. Cl. ........................ 369/32; 369/44.28; 235/454
(58) Field of Search .................... 369/32, 40.28, 369/47, 48, 58, 59, 44.37, 44.35, 44.34, 44.32, 44.29, 15, 51–52, 30; 235/454, 437

(56) References Cited

U.S. PATENT DOCUMENTS

| 4,982,391 | 1/1991 | Sakagami et al. . |
| 5,383,170 * | 1/1995 | Horiguchi et al. ................ 369/44.28 |
| 5,436,438 | 7/1995 | Shikichi . |
| 5,604,720 * | 2/1997 | Kimura et al. ......................... 369/32 |

FOREIGN PATENT DOCUMENTS

| 62-131317 | 6/1987 | (JP) . |
| 1027028 | 1/1989 | (JP) . |
| 5151586 | 6/1993 | (JP) . |
| 7296393 | 11/1995 | (JP) . |
| 8171722 | 7/1996 | (JP) . |

* cited by examiner

*Primary Examiner*—Ali Neyzari
(74) *Attorney, Agent, or Firm*—Hogan & Hartson, LLP.

(57) ABSTRACT

An optical information recording and reproducing method and device, whereby it is possible to prevent reduction in information recording capacity of an optical card and increase in recording and reproduction time due to track jump operations, and there is no occurrence of track jumping errors due to oscillations associated with acceleration and deceleration of the relative speed of movement between the optical card and an optical head. A region where the optical head and optical card are moved at a constant speed relative to each other is provided in the acceleration or deceleration of the relative speed of movement, and a track jump operation is implemented in this region.

13 Claims, 12 Drawing Sheets

TRACK JUMP FOR OPTICAL INFORMATION RECORDING AND REPRODUCING METHOD AND DEVICE

BACKGROUND OF THE INVENTION

1. Field of the Invention

This invention relates to an optical information recording and reproducing method and device, and more particularly, to an optical information recording and reproducing method and device, whereby improvement can be made in the performance of track jump operations of a light beam spot to a desired information track on a card-shaped optical recording medium, whereon a plurality of information tracks are formed mutually in parallel.

2. Description of the Related Art

In many optical information recording and reproduction devices, whereby information is recorded onto and reproduced from an optical information recording medium whilst causing the recording medium to move at high speed relative to an optical head emitting a light beam spot, a card-shaped recording medium, in other words, a recording medium called an optical card, is used.

Here, FIG. 6 shows the composition of a general optical card.

As FIG. 6 shows, the optical card 500 comprises several thousand or several ten thousand information tracks 504 formed mutually in parallel in an information recording region 501 thereof, and information is recorded by shining a light beam spot onto the central region 502 (region represented by p×q surface area) of these information tracks 504 to form pits, and information is reproduced by detecting the presence or absence of pits from the reflected light of the light beam spot.

In addition to forming pits when recording information on the central region 502, pre-formatted information, such as address information for specifying data groups or information tracks 504 required for acquiring bit synchronization, is recorded previously by creating pits.

On the other hand, the end regions 503 (regions represented by r×q surface area) of the information tracks 504 are regions for accelerating and decelerating in order that the optical card is moved at a constant speed relative to the optical head, so no pits are formed in these regions.

FIG. 7 is a diagram giving a partial enlarged illustration of the information recording region 501 of the optical card 500.

Information tracks 504 (504-1, 504-2, 504-3) and guide tracks 505 (505-1–505-4) are formed on the information recording region 501, and pre-formatted data pits 506 constituting pre-formatted data, such as address information, and the like, and recording pits 507 constituting data recorded by the user are formed on the information tracks 504, the absence or presence or these pre-formatted data pits 506 or recording pits 507 representing the respective data types.

The guide tracks 505 are regions of different reflectivity to the information tracks 504, and they are used for autotracking (hereinafter, abbreviated as AT) control in order that the optical information recording and reproduction device does not deviate from the information track 504 when scanning a desired information track 504.

FIG. 8 is a block diagram showing the composition of an optical information recording and reproduction device, and FIG. 9 is an approximate diagram showing the composition of an optical head.

In FIG. 8, the optical information recording and reproduction device 510 comprises: a CPU (Central Processing Unit) 511 for overall control of the device; an MPU (Microprocessor Unit) 512 for controlling the section relating to the recording and reproduction operations of the device, on the basis of the control implemented by the CPU 511; a modulating and demodulating circuit 513 for modulating data being recorded and demodulating data being reproduced; an optical head 514 for creating and detecting recording pits 507, and the like; a y-direction drive motor 515 which drives the optical head 514 reciprocally in the y direction; an x-direction drive motor 516 which drives the optical card 500 reciprocally in the x direction; a track jump circuit 517 for controlling track jumping; an AF/AT control circuit 518 for performing autofocussing (hereinafter, abbreviated as AF) control and AT control such that a focused light beam spot is shined onto the surface of the light card 500 at all times, even if there are fluctuation in this surface; and a movement speed detecting circuit 519 for detecting the speed of movement of the optical card 500.

Furthermore, as shown in FIG. 9, the optical head 514 comprises: a semiconductor laser 541, collimator lens 542, diffraction grating 543, beam splitter 544, object lens 545, light receiving lens 546, photoreceptor 547, and actuator 548. Laser light output from the semiconductor laser 541 is formed into parallel light by the collimator lens 542 and split by the diffraction grating 543 into three beams, which are shined via the beam splitter 544 and object lens 545 onto the optical card 500 as beam spots 550. The reflected light from the beam spots 550 shined onto the optical card 500 passes through the object lens 545, beam splitter 544 and light receiving lens 546 and is converted to an electrical signal by the photoreceptor 547. Since one of the three beam spots shined onto the optical card 500 is shined onto an information track 504, and the other two beam spots are shined onto the guide tracks 505 on either side of this information track 504, the reflected light, in other words, the signal converted to an electrical signal by the photoreceptor 547, contains a focussing control signal and tracking control signal in addition to a data signal. In order for the optical recording and reproduction device 510 to record or reproduce information on a desired information track 504, the information track 504 must be selected accurately. In general, the operation of selecting an information track is call track access, or simply access, and it comprises the operations of moving the whole optical head 514 in a direction perpendicular to the information track 504, and moving a portion of the optical system in the optical head 514, for instance, the object lens 545, in a direction perpendicular to the information tracks 504 by means of an actuator 548, the latter operation also being called a track jump operation.

Here, a first example relating to a conventional track jump operation, wherein the relative speed of movement between the optical card and optical head is constant, is described with reference to FIG. 10 and FIG. 11.

FIG. 10 is a diagram illustrating the relationship between the relative speed of movement of the optical card and time, and their relationship to the pulse voltage applied by the optical information recording and reproduction device to the actuator for moving the optical card and time. FIG. 11 is a flowchart showing the sequence of a track jump operation in an optical information recording and reproduction device.

In order to record or reproduce information to or from the optical card, the optical recording and reproduction device 510 starts an operation whereby the optical card 500 is moved reciprocally by driving the x direction drive motor 516, such that the optical card 500 and optical head 514 move relative to each other (step 601 in FIG. 11), and the MPU 512 applies an acceleration pulse (voltage V1) to the x direction drive motor 516 to accelerate the relative speed of movement of the optical card 500 to a prescribed speed v1 (step 602; section a in FIG. 10).

If the movement speed detecting circuit 519 detects that the relative speed of movement of the optical card 500 has reached a prescribed speed v1, (hereinafter, all detection of the relative speed of movement of the optical card 500 is carried out by the movement speed detecting circuit 519), then the optical recording and reproduction device 510 applies a constant-speed pulse (voltage V2) for maintaining that speed to the x direction drive motor 516 (step 603; section b), and performs a recording operation for recording information modulated by the modulating and demodulating circuit 513 onto a prescribed information track 504 of the optical card 500, or a reproduction operation for reproducing information recorded on a prescribed information track 504 of the optical card 500 and demodulating the information by means of the modulating and demodulating circuit 513, in a state where the relative speed of movement of the optical card 500 is constant (step 604; section b).

When the recording or reproduction operation is completed, the optical information recording and reproduction device 510 actuates the AF/AT control circuit 518, opening the AT control loop and halting AT control, (step 605, section b), whilst maintaining the relative speed of movement of the optical card 500 at v1.

The AT control is halted in this way because the object of AT control is to make the light beam spot continue shining on the desired information track, and therefore when performing a track jump for moving the light beam spot to a different information track 504, the AT control and track jump operations conflict with each other.

When the AT control is halted, the track jump circuit 517 applies a track jump pulse to the actuator 548 which moves the object lens 545, thereby causing the object lens 545 to move in a direction perpendicular to the information tracks 504 (step 606; section b).

Thereupon, the track jump circuit 517 applies a brake pulse of opposite polarity to the track jump pulse to the actuator 548, (step 607, section b), thereby decelerating the speed of movement of the object lens 545 and causing the object lens 545 to come to rest in a position whereby the light beam spot shines on the desired information track 504.

When the point of illumination of the light beam spot moves to the desired information track 504, the AF/AT control circuit 518 closes the AT control loop and starts AT control (step S608, section b), and the MPU 512 applies a decelerating pulse (voltage −V1) to the x direction drive motor 516, thereby decelerating the relative speed of movement of the optical card 500 (step 609, section c). This decelerating pulse is applied until the relative speed of movement of the optical card 500 reaches zero (NO at step 610), and when this relative speed of movement reaches zero (YES at step 610, section d), an accelerating pulse (voltage −V1) is applied to the x direction drive motor 516 and the relative speed of movement of the optical card 500 is accelerated until it reaches a prescribed speed −v1 (step 611, section e). Here, the accelerating pulse applied is an accelerating pulse of opposite polarity to the accelerating pulse applied at step 602, and therefore the direction of the relative movement of the optical card 500 is opposite to the direction of movement when in the acceleration operation in step 602.

When the relative speed of movement of the optical card 500 reaches a prescribed speed −v1, the MPU 512 applies a constant-speed pulse (voltage −V1) for maintaining that speed to the x direction drive motor 516 (step 612, section f), and the optical head 514 records or reproduces information to or form a desired information track 504 of the optical card 500 (step 613, section f), whereupon the AF/AT control circuit 518 closes the AT control loop and halts AT control (step 614, section f).

When the AT control is halted, the track jump circuit 517 applies a track jump pulse to the actuator 548, thereby causing the object lens 545 to move in the direction perpendicular to the information tracks 504 (step 615, section f).

Thereupon, the track jump circuit 517 applies a brake pulse of opposite polarity to the track jump pulse to the actuator 548 (step 616, section f), thereby decelerating the speed of movement of the object lens 545 and causing the object lens 545 to come to rest in a position whereby the light beam spot shines onto the desired information track 504.

When the point of illumination of the light beam spot has moved to the desired information track 504, the AF/AT control circuit 518 closes the AT control loop and starts AT control (step 617, section f).

Next, the MPU 512 applies a decelerating pulse (voltage V1) to the x direction drive motor 516, decelerating the relative speed of movement of the optical card (step 618, section g), and when the relative speed of movement reaches zero (YES at step 619, section h), the process returns to step 602 and an accelerating pulse is applied again to the x direction drive motor 516 (step 602, section i).

These operations are repeated until the optical recording and reproduction device 510 has completed the prescribed recording or reproduction operation.

Next, a case where a track jump operation is carried out in a state where the relative speed of movement between the optical card and optical head is zero, as proposed in Japanese Patent Examined Publication No. 6-9088, is described with reference to FIG. 10 and FIG. 12, as a second example of a conventional track jump operation.

FIG. 12 is a flowchart showing the sequence of a track jump operation in an optical recording and reproduction device.

When the optical recording and reproduction device 510 starts an operation whereby the optical card 500 and optical head 514 are moved relative to each other by moving the optical card 500 reciprocally, in order to record and reproduce information to and from the optical card 500, (step 701 in FIG. 12), the MPU 512 applies an accelerating pulse (voltage V1) to the x direction drive motor 516, thereby accelerating the speed of relative movement of the optical card 500 to a prescribed speed v1 (step 702; section a in FIG. 10).

When the relative speed of movement of the optical card 505 505 reaches the prescribed speed v1, the MPU 512 applies a constant-speed pulse (voltage V2) for maintaining that speed to the x direction drive motor 516 (step 703, section b), and the optical head 514 records or reproduces information to or from a prescribed information track 504 of the optical card 500 (step 704, section b).

When the optical card 500 and optical head 514 assume a prescribed positional relationship, the MPU 512 applies a decelerating pulse (voltage −V1) to the x direction drive motor 516, thereby decelerating the relative speed of movement of the optical card 500 (step 705, section c). This decelerating pulse is applied until the relative speed of movement of the optical card 500 reaches zero (NO at step 706), and when the relative speed of movement reaches zero (YES at step 706, section d), the AF/AT control circuit 518 opens the AT control loop and halts AT control (step 707, section d).

When the AT control is halted, the track jump circuit 517 applies a track jump pulse to the actuator 548 which drives the object lens 545, thereby moving the object lens 545 in a direction perpendicular to the information track 504 (step 708, section d).

Next, the track jump circuit 517 applies a brake pulse of opposite polarity to the track jump pulse to the actuator 548 (step 709, section d), thereby decelerating the speed of movement of the object lens 545, such that the object lens comes to rest in a position where the light beam spot shines onto the desired information track 504.

When the illumination point of the light beam spot has moved to the desired information track 504, the AF/AT control circuit 518 closes the AT control loop and starts AT control (step 710, section d), and the MPU 512 applies an accelerating pulse (voltage −V1) to the x direction drive motor 516, thereby accelerating the relative speed of movement of the optical card 500 to the prescribed speed−v1(step 711, section e). Here, the accelerating pulse applied is of opposite polarity to the accelerating pulse applied at step 702, and the direction of relative movement of the optical card 500 is opposite to the direction of movement due to the acceleration in step 702.

When the relative speed of movement of the optical card 500 has reached a prescribed speed−v1, the MPU 512 applies a constant-speed pulse (voltage−v2) for maintaining this speed to the x direction drive motor 516 (step 712, section f), and the optical head 514 records or reproduces information to or from a desired information track 504 of the optical card 500 (step 713, section f).

When the optical card 500 and optical head 514 assume a prescribed positional relationship, the MPU 512 applies a decelerating pulse (voltage V1) to the x direction drive motor 516, decelerating the relative speed of movement of the optical card 500 (step 714, section g), and when the relative speed of movement reaches zero (YES at step 715, section h), the AF/AT control circuit 518 opens the AT control loop and halts AT control (step 716, section h).

When the AT control is halted, the track jump circuit 517 applies a jump track pulse to the actuator 548, thereby causing the object lens 545 to move in a direction perpendicular to the information tracks 504 (step 717, section h).

Next, the track jump circuit 517 applies a brake pulse of opposite polarity to the track jump pulse to the actuator 548 (step 718, section h), decelerating the speed of movement of the object lens 545 such that it comes to rest in a position where the light beam spot is shined onto the desired information track 504.

When the illumination point of the light beam spot has moved to the desired information track 504, the AF/AT control circuit 518 closes the AT control loop and starts AT control (step 719, section h), and the process returns to step 702, where the MPU 512 applies an accelerating pulse to the x direction drive motor 516 (step 702, section i).

These operations are repeated until the optical recording and reproduction device 510 has completed the prescribed recording and reproduction operations.

Next, a case where a track jump operation is implemented when the relative speed of movement between the optical card and optical head is accelerating or decelerating, as disclosed in Japanese Patent Unexamined Publication No. 5-282682, is described with reference to FIG. 10 and FIG. 13 as a third example of a conventional track jump operation.

FIG. 13 is a flowchart showing the sequence of a track jump operation in an optical recording and reproduction device.

When an operation is started whereby the optical card 500 and optical head 514 are moved relative to each other by moving the optical card 500 reciprocally, in order that the optical recording and reproduction device 510 records or reproduces information to or from the optical card 500 (step 801 in FIG. 13), the MPU 512 applies an accelerating pulse (voltage V1) to the x direction drive motor and accelerates the relative speed of movement of the optical card 500 to a prescribed speed v1 (step 802, section a in FIG. 10).

Here, in the period until the relative speed of movement of the optical card 500 reaches the speed v1, the AF/AT control circuit 518 opens the AT control loop and halts AT control (step 803, section a), and the track jump circuit 517 applies a track jump pulse to the actuator 548, causing the object lens 545 to move in a direction perpendicular to the information tracks 504 (step 804, section a).

Thereupon, the track jump circuit 517 applies a brake pulse of opposite polarity to the track jump pulse to the actuator 548 (step 805, section a), thereby decelerating the speed of movement of the object lens 545 such that it comes to rest in a position where the light beam spot shines onto the desired information track 504.

When the illumination point of the light beam spot has moved to the desired information track 504, the AF/AT control circuit 518 closes the AT control loop and starts AT control (step 806, section a).

Next, when the relative speed of movement of the optical card 500 reaches the prescribed speed v1, the MPU 512 applies a constant-speed pulse (voltage V2) for maintaining this speed to the x direction drive motor 516 (step 807, section b), and the optical head 514 records or reproduces information to or from a desired track 504 of the optical card 500 (step 807, section b).

When the optical card 500 and optical head 514 assume a prescribed positional relationship, the MPU 512 applies a decelerating pulse (voltage −V1) to the x direction drive motor 516, thereby decelerating the relative speed of movement of the optical card 500 (step 809, section c). This decelerating pulse is applied until the relative speed of movement of the optical card 500 reaches zero (NO at step 810), and when the relative speed of movement reaches zero (YES at step 810, section d), the MPU 512 applies an accelerating pulse (voltage −V1) to the x direction drive motor 516, accelerating the relative speed of movement of the optical card 500 to a prescribed speed−v1 (step 811, section e).

In this case, the accelerating pulse applied is of opposite polarity to the accelerating pulse applied in step 802, and the direction of relative movement of the optical card 500 is opposite to the direction of movement inducted by the acceleration in step 802.

Here, in the period until the relative speed of movement of the optical card 500 reaches the speed−v1, the AF/AT control circuit 518 opens the AT control loop and halts AT control (step 812, section e), and the track jump circuit 517 applies a track jump pulse to the actuator 548, causing the object lens 545 to move in a direction perpendicular to the information tracks 504 (step 813, section e).

Thereupon, the track jump circuit 517 applies a brake pulse of opposite polarity to the track jump pulse to the actuator 548 (step 814, section e), thereby decelerating the speed of movement of the object lens 545 such that it comes to rest in a position where the light beam spot shines onto the desired information track 504.

When the illumination point of the light beam spot has moved to the desired information track 504, the AF/AT control circuit 518 closes the AT control loop and starts AT control (step 815, section e).

Next, when the relative speed of movement of the optical card 500 reaches the prescribed speed–v1, the MPU 512 applies a constant-speed pulse (voltage –V2) for maintaining this speed to the x direction drive motor 516 (step 816, section f), and the optical head 514 records or reproduces information to or from a desired track 504 of the optical card 500 (step 817, section f).

When the optical card 500 and optical head 514 assume a prescribed positional relationship, the MPU 512 applies a decelerating pulse (voltage V1) to the x direction drive motor 516, thereby decelerating the relative speed of movement of the optical card 500 (step 818, section g), and when the relative speed of movement of the optical card 500 reaches zero (YES at step 819, section h), it returns to step 802 and applies an accelerating pulse to the x direction drive motor 516 (step 802, section i).

These operations are repeated until the optical recording and reproduction device 510 has completed the prescribed recording and reproduction operations.

Furthermore, the track jump operation can be implemented during deceleration of the relative speed of movement, by a similar method.

In the first example of a conventional track jump operation described above, track jumping is implemented when the relative speed of movement between the optical card and optical head is constant. However, this constant state of the relative speed of movement corresponds to the timing at which the optical head scans the central region of the optical card, and since the optical card and optical head are moving at a high relative speed, the number of pits that can be formed in the central region of the optical card is reduced and consequently, a problem arises in that the amount of information that can be recorded onto the optical card is reduced.

Furthermore, in the second example of a conventional track jump operation, since track jumping is implemented when the relative speed of movement between the optical card and optical head is zero, in other words, when the optical head is scanning an end region of the optical card, the problem associated with the first example is resolved, but a further problem arises in that the relative speed of movement between the optical card and optical head must be held longer in a zero state in order to perform the track jump operation, and therefore the time required for recording or reproducing info is increased.

In the third example of a conventional track jump operation, since track jumping is implemented when the relative speed of movement between the optical card and the optical head is accelerating or decelerating, the optical head does not record or reproduce any information during this acceleration (or deceleration), and therefore there is no problem of reduced information recording capacity as in the first example, and it is also unnecessary to hold the relative speed of movement of the optical card and optical head at zero for a long period of time.

However, in the third example of a track Jump operation, due to the oscillation induced by acceleration or deceleration of the relative speed of movement between the optical card and optical head, a problem arises in that track jumping cannot be performed accurately and the device may jump incorrectly to a different information track from the desired information track.

SUMMARY OF THE INVENTION

Therefore, it is an object of the present invention to provide an optical information recording and reproduction device and method for same, whereby it is possible to prevent reduction in the information recording capacity of an optical card and increase in the recording and reproduction time associated with track jump operations, and incorrect track jumping caused by oscillations induced by acceleration or deceleration of the relative speed of movement between the optical card and optical head can be eliminated.

In order to achieve the aforementioned object, this invention provides an optical information recording and reproducing method for carrying out information recording and reproduction with respect to an optical information recording medium by means of an optical head, by moving the optical head relative to the optical information recording medium, comprising the steps of: providing a constant-speed region where the speed of the optical head is held constant in at least one of an acceleration region and a deceleration region of the optical head; and performing a jump operation to a recording and reproduction track by the optical head in the constant-speed region.

Here, the optical information recording medium may be constituted by an optical card.

Furthermore, the constant-speed region may be constituted by such that it corresponds to the time required for the jump operation.

Moreover, this invention provides an optical information recording and reproducing method for carrying out information recording and reproduction with respect to an optical card by means of an optical head, by moving the optical head relative to the optical card, comprising:

a first step of accelerating the optical card up to a prescribed speed with respect to the optical head;

a second step of moving the optical card at a first constant speed with respect to the optical head after the acceleration operation according to the first step has been completed;

a third step of decelerating the optical card from the prescribed speed;

a fourth step of moving the optical card at a second constant speed during at least one of the acceleration operation in the first step and the deceleration operation in the third step;

a fifth step of carrying out recording and reproduction of the information by means of the optical head during the first constant-speed operation in the second step;

and a sixth step of implementing a jump operation to a recording and reproduction track by the optical head during the second constant-speed operation according to the fourth step.

This invention also provides an optical information recording and reproduction device for carrying out information recording and reproduction with respect to an optical information recording medium by means of an optical head, by moving the optical head relative to the optical information recording medium, comprising:

movement speed control means for providing a constant-speed region where a speed of the optical head is held constant in at least one of an acceleration region and a deceleration region of the optical head; and track jump control means for implementing a jump operation to a recording and reproduction track by the optical head in the constant-speed region.

Here, the optical information recording medium may be constituted by an optical card.

Furthermore, the movement speed control means may be constituted such that the constant-speed region corresponds to a time period required for the jump operation.

Moreover, this invention provides an optical information recording recording and reproduction device for carrying out information recording and reproduction with respect to an optical card by means of an optical head, by reciprocally moving the optical card relative to the optical head, comprising: movement speed control means for controlling an acceleration operation in which the optical card is accelerated to a prescribed speed with respect to the optical head; a first constant-speed operation in which the optical card is moved at a prescribed constant speed, following the acceleration operation; a deceleration operation in which the optical card is decelerated from the prescribed speed, following the first constant-speed operation; and a second constant-speed operation in which the optical card is moved at a constant speed during at least one of the acceleration operation and the deceleration operation of the optical card; recording and reproducing means for carrying out recording and reproduction of the information by means of the optical head, during the first constant-speed operation; and track jump control means for implementing a jump operation to a recording and reproduction track by the optical head during the second constant-speed operation.

According to this invention, since a composition is adopted whereby regions are provided where the optical head and optical card are moved at a constant relative speed during the acceleration or deceleration of their relative speed of movement, when recording or reproducing information to or from an optical card, and track jump operations are performed in these regions, it is possible to prevent reduction in the information recording capacity of an optical card or increase in the recording and reproduction time due to these track jump operations, and furthermore, it is also possible to prevent track jump errors due to oscillations associated with the acceleration or deceleration of the relative speed of movement of the optical card and optical head.

Moreover, by avoiding the corner regions of the optical card and performing track jump operations towards the inner portion of the card, operational problems due to scratches or deformations, which are liable to occur in the corner regions of the optical card, can also be effectively prevented.

DESCRIPTION OF THE PREFERRED EMBODIMENTS

Below, one embodiment of an optical information recording and reproducing method and device relating to this invention is described in detail with reference to the accompanying drawings.

Since the optical card used in this embodiment is of similar composition to the conventional optical card 500 and the optical information recording and reproduction device is of similar composition to the conventional optical information recording and reproduction device 510, these are described with reference to FIGS. 6–9.

Figure 1:
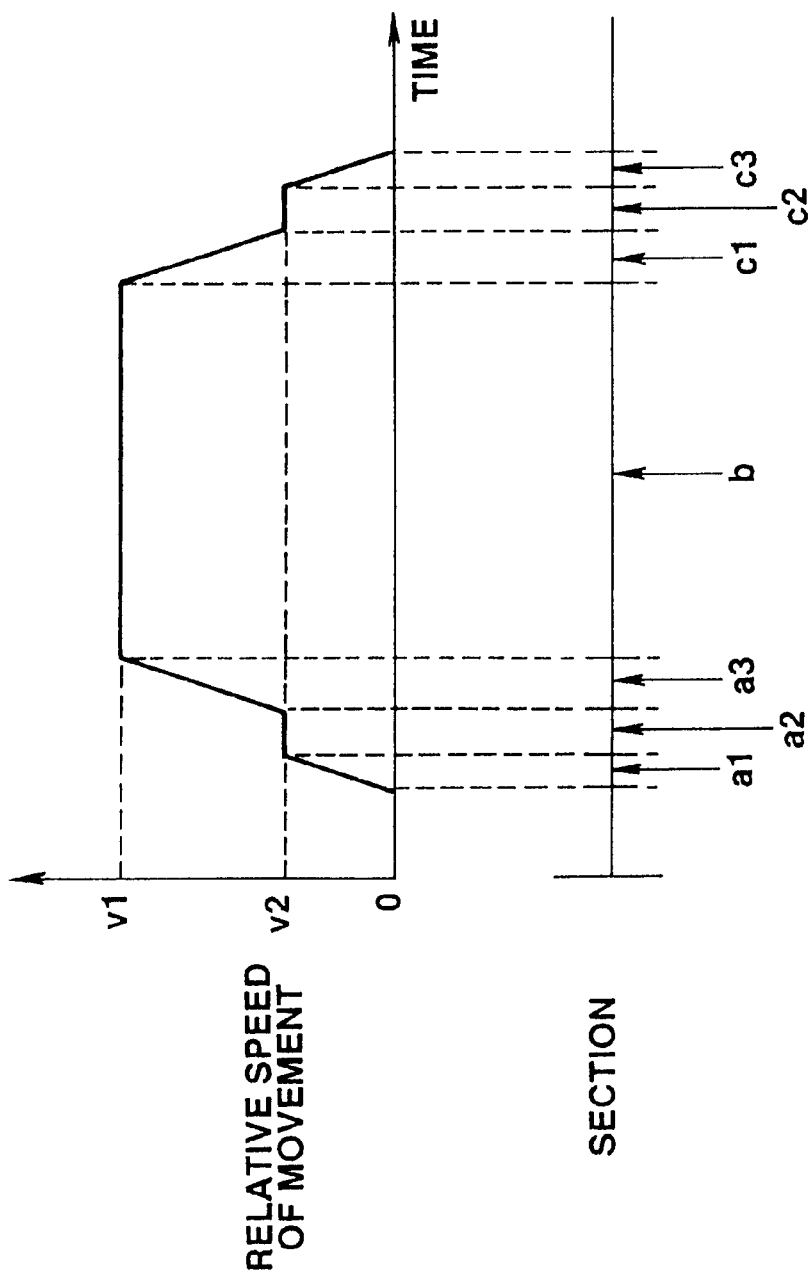
FIG. 1 is a diagram illustrating the relative speed of movement between an optical card and optical head in an optical information recording and reproducing method and device relating to this invention.

FIG. 1 is a diagram illustrating an optical card and optical head in an optical information recording and reproducing method and device relating to this invention.

In FIG. 1, section a (a1, a2, a3) is a section where the relative speed of movement between the optical card 500 and the optical head 514 is accelerated to a prescribed speed v1 in order that the optical information recording and reproduction device 510 can record or reproduce information; section b is a section where the relative speed of movement between the optical card 500 and the optical head 514 is held constant (v1) and information recording or reproduction is carried out; and section c (c1, c2, c3) is a section where the relative speed of movement between the optical card 500 and optical head 514 is decelerated to zero.

Here, section a2 is a section where the relative speed of movement between the optical card 500 and the optical head 514 is temporarily held at a constant speed (v2) during the acceleration from zero to v1, and the optical information recording and reproduction device 510 performs a track jump operation in this section a2.

Similarly, section c2 is a section where the relative speed of movement between the optical card 500 and the optical head 514 is temporarily held at a constant speed (v2) during the deceleration from v1 to zero, and the optical information recording recording and reproduction device 510 performs a track jump operation in this section c2.

Sections a2 and c2 can be set such that the speed is held constant at any position in the acceleration or deceleration periods of the relative speed of movement.

In practice, in order to record or reproduce information by reciprocal movement of the optical card 500, the track jump operation can be carried out in either section a2 during acceleration or section c2 during deceleration.

Control for performing a track jump operation during acceleration or deceleration is performed by the CPU 511 or MPU 512, which operate the various sections of the optical information recording and reproduction device 510 on the basis of processing commands recorded in a memory device (omitted from the drawings).

Here, a track jump operation will be described with reference to FIG. 2 and FIG. 3.

Figure 2:
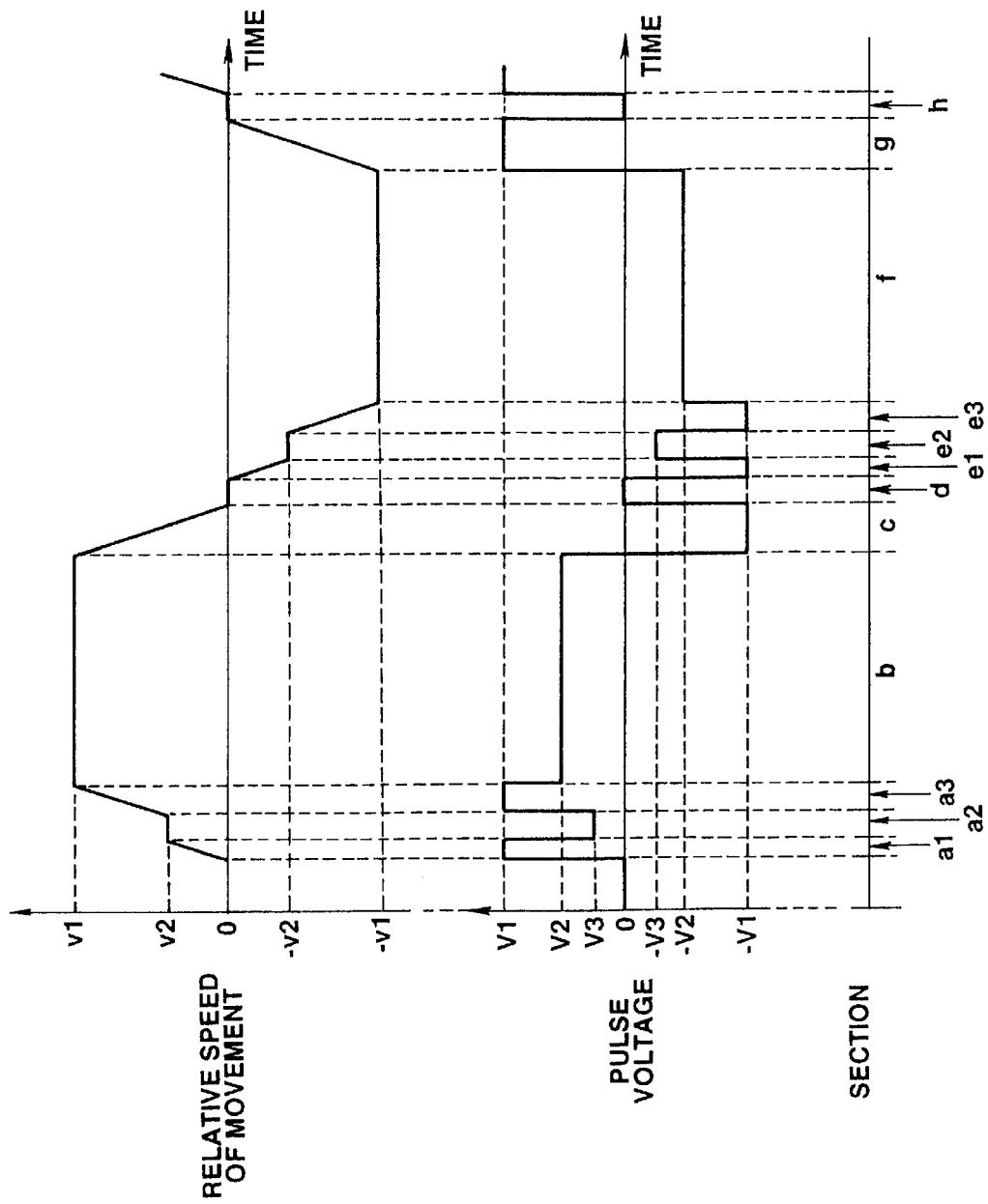
FIG. 2 is a diagram illustrating relative speed of movement and pulse voltages.
Figure 3:
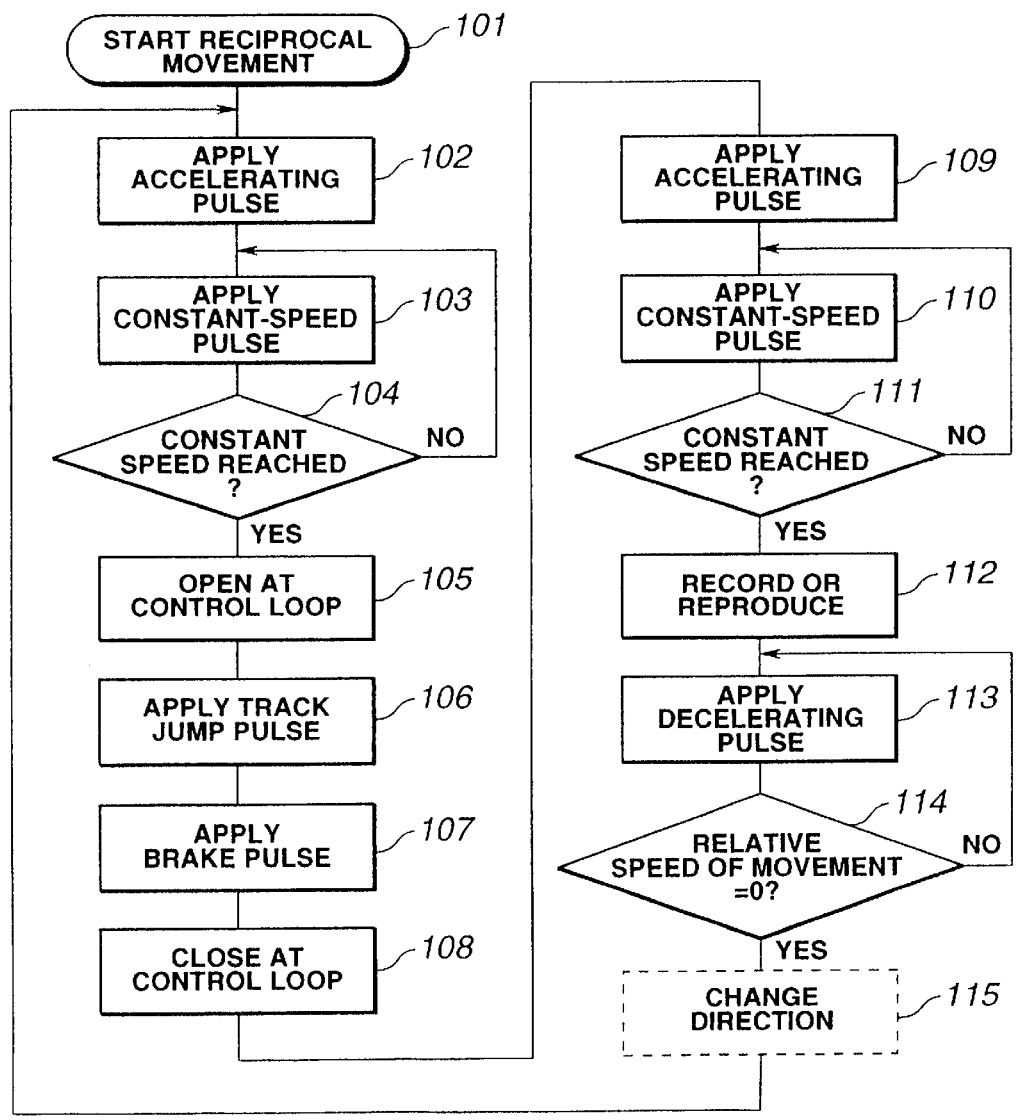
FIG. 3 is a flowchart showing the sequence of a track jump operation.

FIG. 2 is a diagram illustrating relative speed of movement and pulse voltages, and FIG. 3 is a flowchart showing the sequence of a track jump operation.

When the optical information recording and reproduction device 510 starts reciprocal movement of the optical card 500 (step 101 in FIG. 3), firstly, the MPU 512 applies an accelerating pulse (voltage V1) to the x direction drive motor 516, thereby accelerating the optical card 500 to a prescribed speed v2 (section a1 in FIG. 2, step 102), whereupon it applies a constant-speed pulse (voltage V3) to the x direction drive motor 516 (section a2, step 103), and when the optical card 500 has reached a constant speed (section a2, YES at step 104), the AF/AT control circuit 518 opens the AT control loop (section a2, step 105), and the track jump circuit 517 applies a track jump pulse to an actuator 548 which drives the object lens 545 (section a2, step 106).

Next, the track jump circuit 517 applies a brake pulse to the actuator 548 such that the beam spot comes to rest over the desired information track 504 (section a2, step 107), the AF/AT control circuit 518 closes the AT control loop (section a2, step 108), and the MPU 512 again applies an accelerating pulse (voltage V1) to the x direction drive motor 516, causing the optical card 500 to accelerate to a prescribed speed v1 (section a3, step 109).

When the relative speed of movement of the optical card 500 reaches the prescribed speed v1, the MPU 512 applies a constant-speed pulse (voltage V2) to the x direction drive motor 516 (section b, step 110), and then the optical card 500 has assumed a constant speed (section b, YES at step 111), the optical head 514 records or reproduces information (section b, step 112).

When the beam spot reaches a prescribed position on the optical card 500 due to the movement of the optical card 500, the MPU 512 applies a decelerating pulse (voltage −V1) to the x direction drive motor 516 (section c, step 113), and when the relative speed of movement of the optical card 500 reaches zero (section d, YES at step 114), it switches the direction of movement of the optical card 500 (section d, step 115).

Thereupon, returning to step 102, the MPU 512 applies an accelerating pulse (voltage −V1) to the x direction drive motor 516, thereby accelerating the optical card 500 to a prescribed speed −v2 (section e1, step 102), whereupon it applies a constant-speed pulse (voltage −V3) to the x direction drive motor 516 (section e2, step 103), and when the optical card 500 has assumed a constant speed (section e2, YES at step 104), the AF/AT control circuit 518 opens the AT control loop (section e2, step 105), and the track jump circuit 517 applies a track jump pulse to the actuator 548 (section e2, step 106).

Thereupon, the track jump circuit 517 applies a brake pulse to the actuator 548 such that the beam spot comes to rest over the desired information track 504 (section e2, step 107), the AF/AT control circuit 518 closes the AT control loop (section e2, step 108) and the MPU 512 again applies an accelerating pulse (voltage −V1) to the x direction drive motor 516, thereby accelerating the optical card 500 to a prescribed speed −v1 (section e3, step 109).

When the relative speed of movement of the optical card 500 reaches the prescribed speed −v1, the MPU 512 applies a constant-speed pulse (voltage −V2) to the x direction drive motor 516 (section f, step 110), and then the optical card 500 has assumed a constant speed (section f, YES at step 111), the optical head 514 records or reproduces information (section f, step 112).

When the beam spot reaches a prescribed position on the optical card 500 due to the movement of the optical card 500, the MPU 512 applies a decelerating pulse (voltage V1) to the xdirection drive motor 516 (section g, step 113), and when the relative speed of movement of the optical card 500 reaches zero (section h, YES at step 114), it switches the direction of movement of the optical card 500 (section h, step 115) and returns again to step 102.

By means of the operation described above, the optical card 500 completes a single reciprocal movement cycle, and this movement is continued as necessary, to record or reproduce information.

Next, a second embodiment of a track jump operation is described with reference to FIGS. 4 and FIG. 5.

Figure 4:
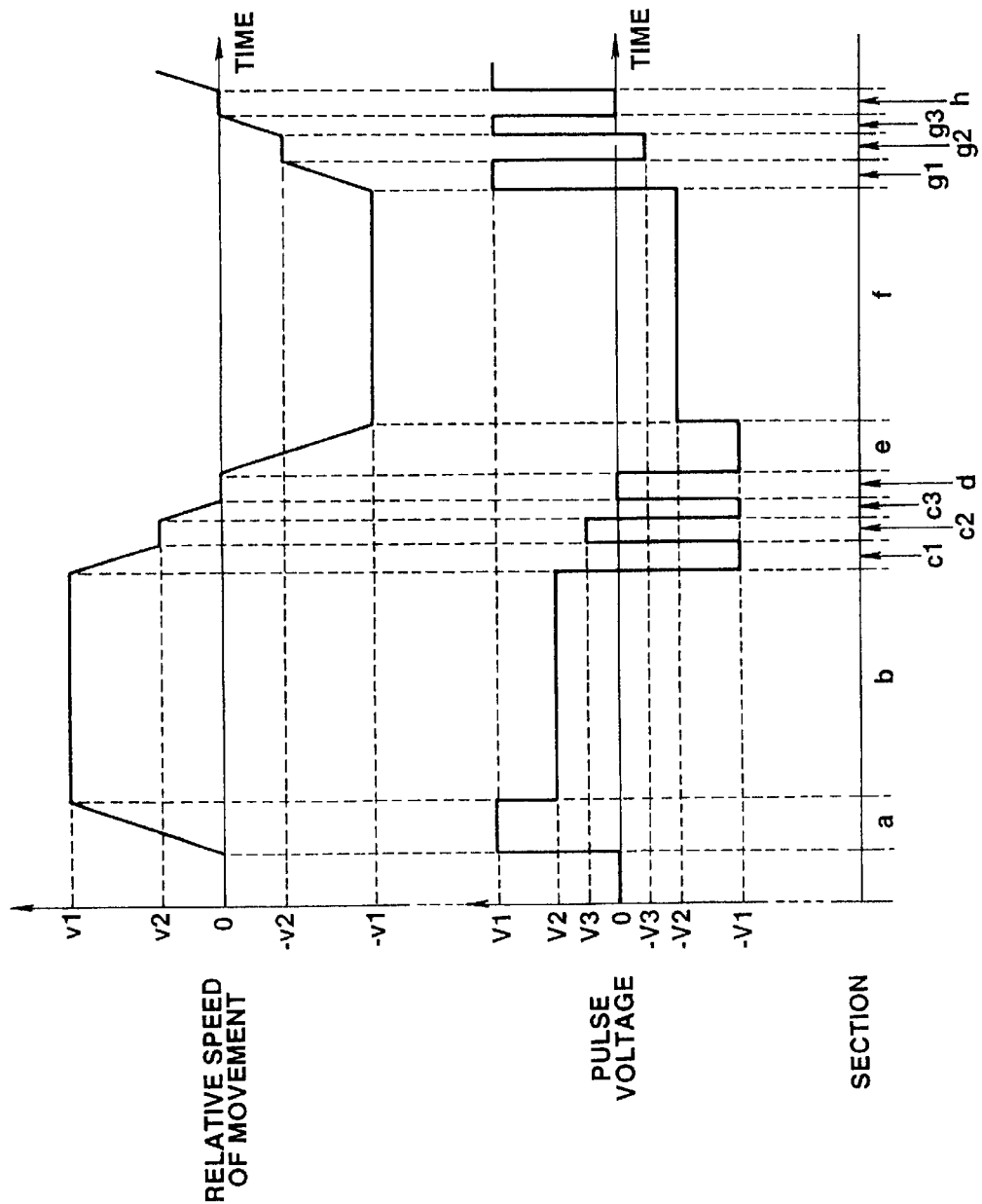
FIG. 4 is a diagram illustrating relative speed of movement and pulse voltages in a second embodiment.
Figure 5:
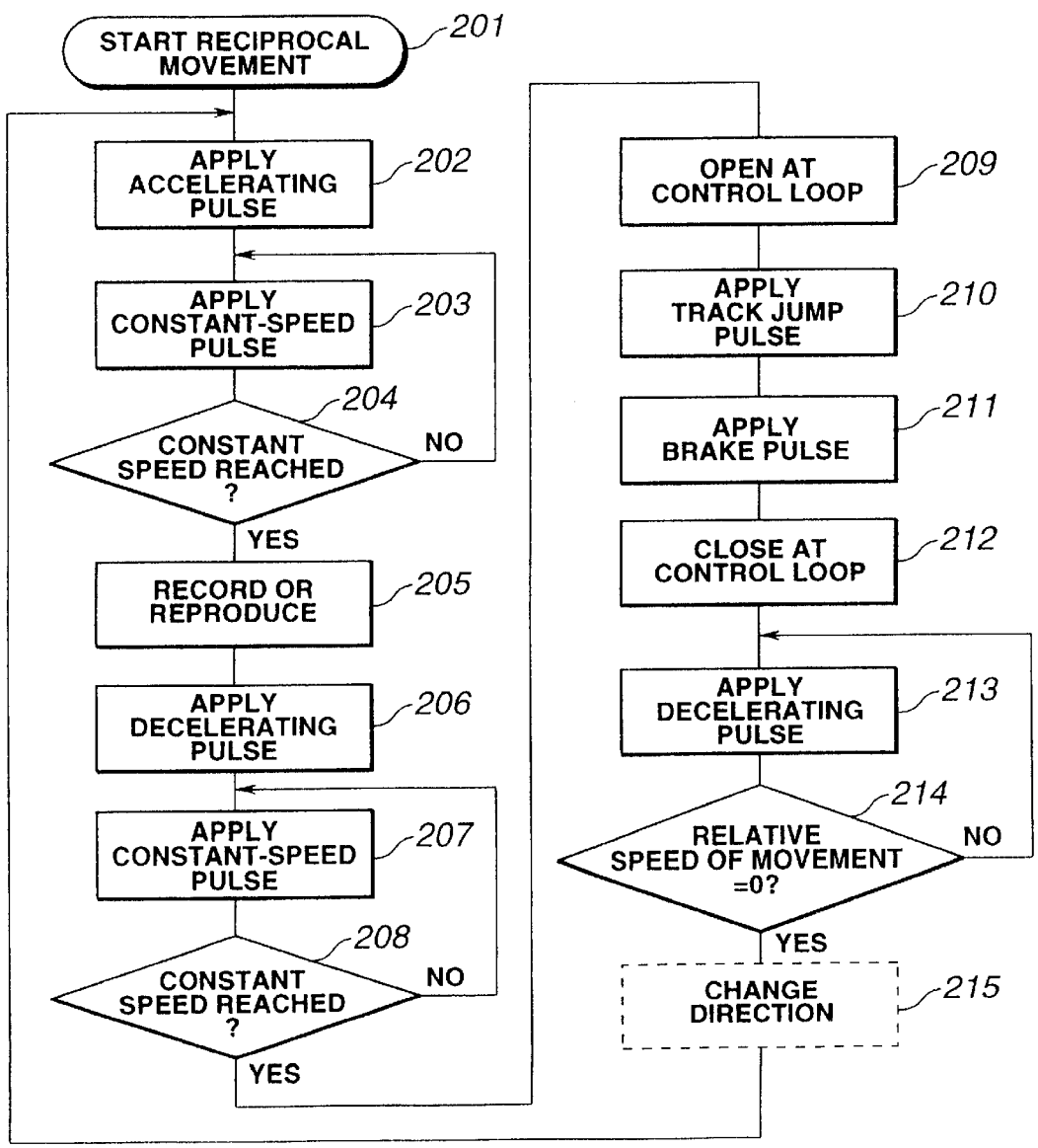
FIG. 5 is a flowchart showing the sequence of a track jump operation in a second embodiment.
Figure 6:
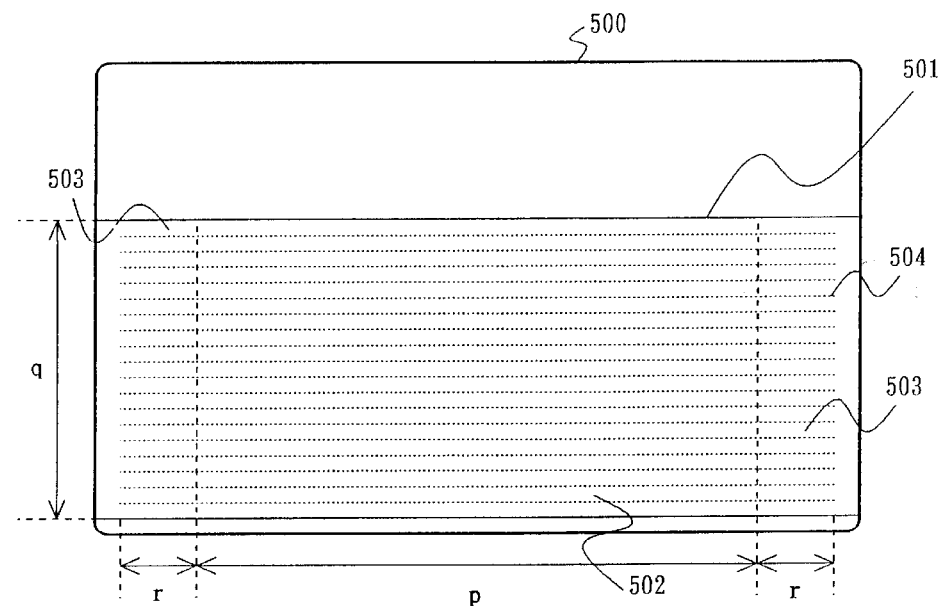
FIG. 6 is a diagram illustrating the composition of a general optical card.
Figure 7:
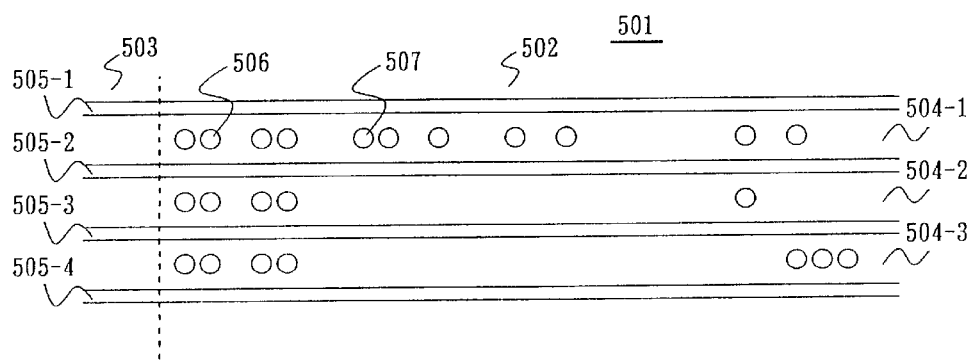
FIG. 7 is an enlarged view of a recording region of the optical card.
Figure 8:
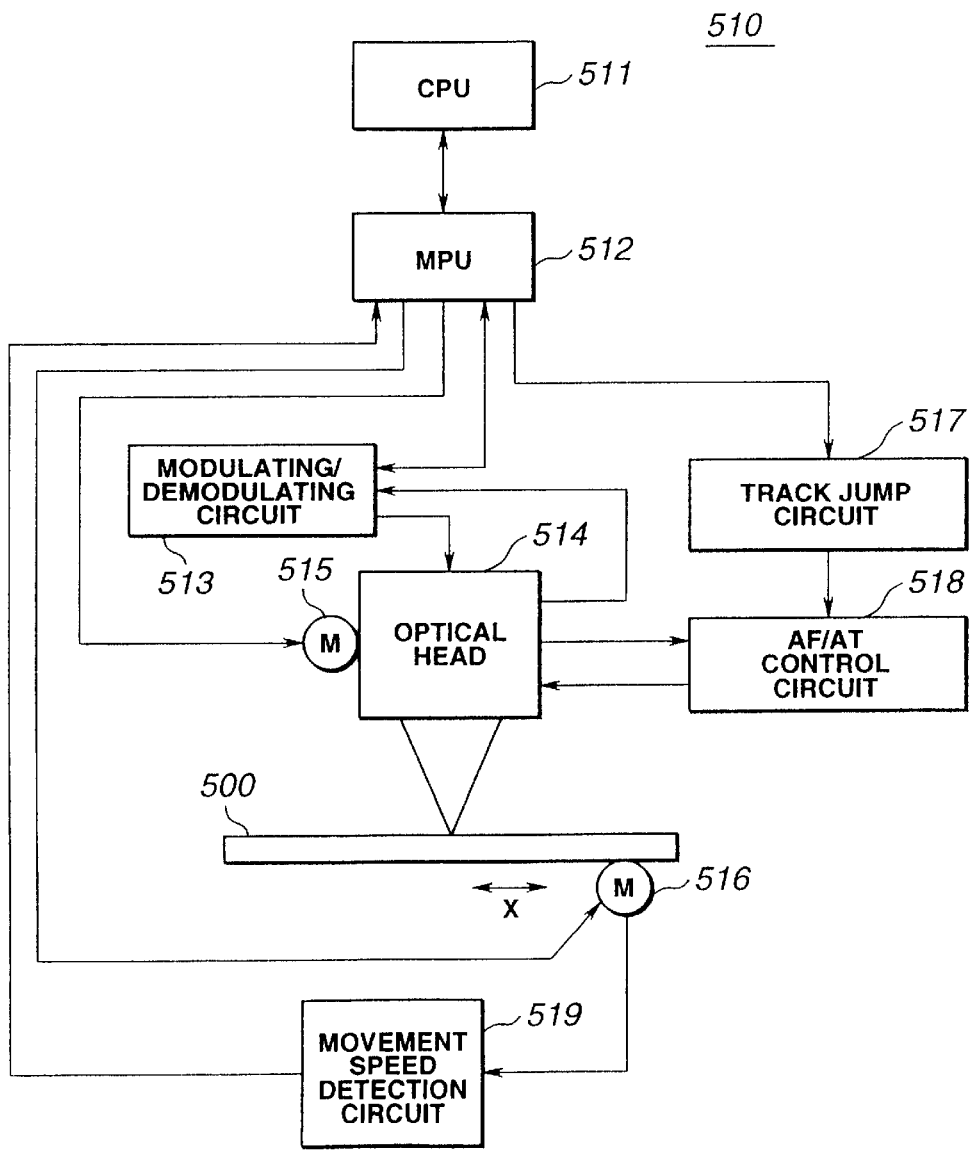
FIG. 8 is a block diagram showing the composition of an optical information recording and reproduction device.
Figure 9:
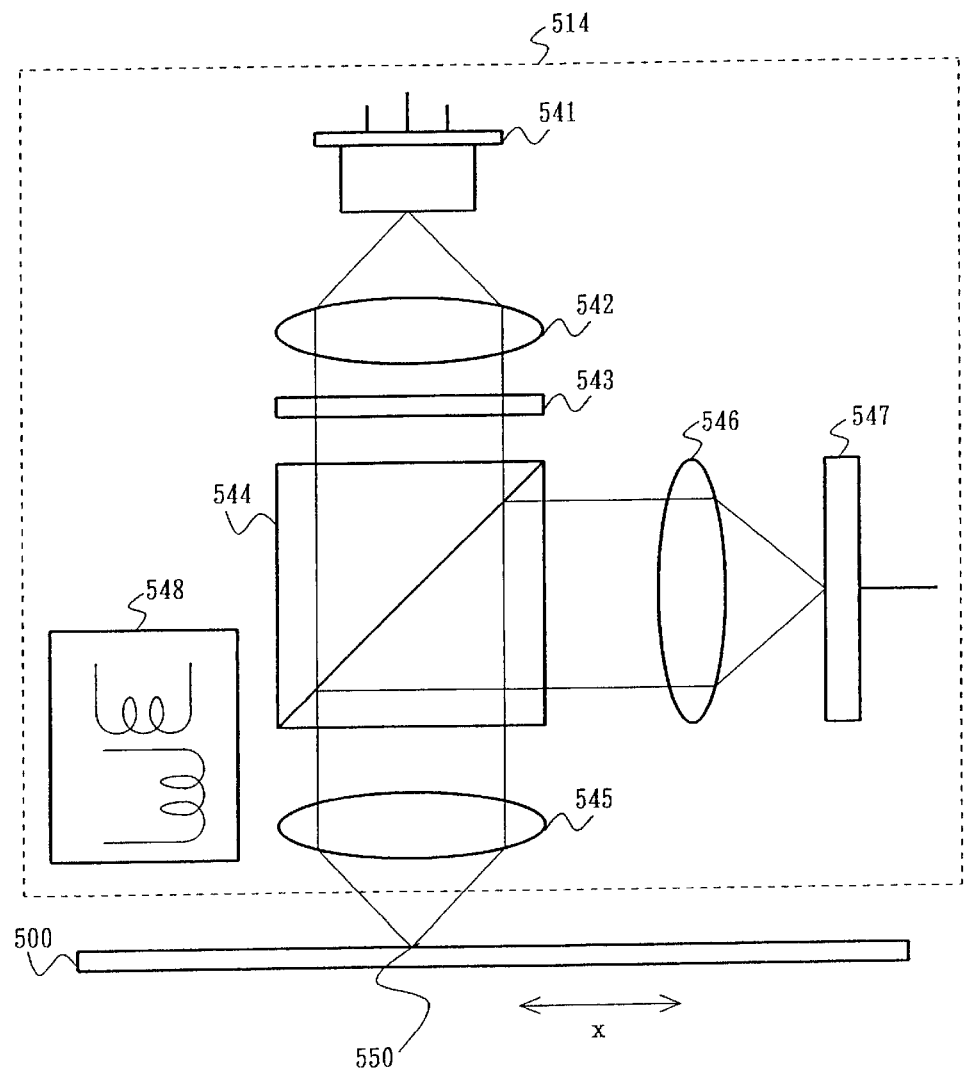
FIG. 9 is an approximate diagram showing the composition of an optical head.
Figure 10:
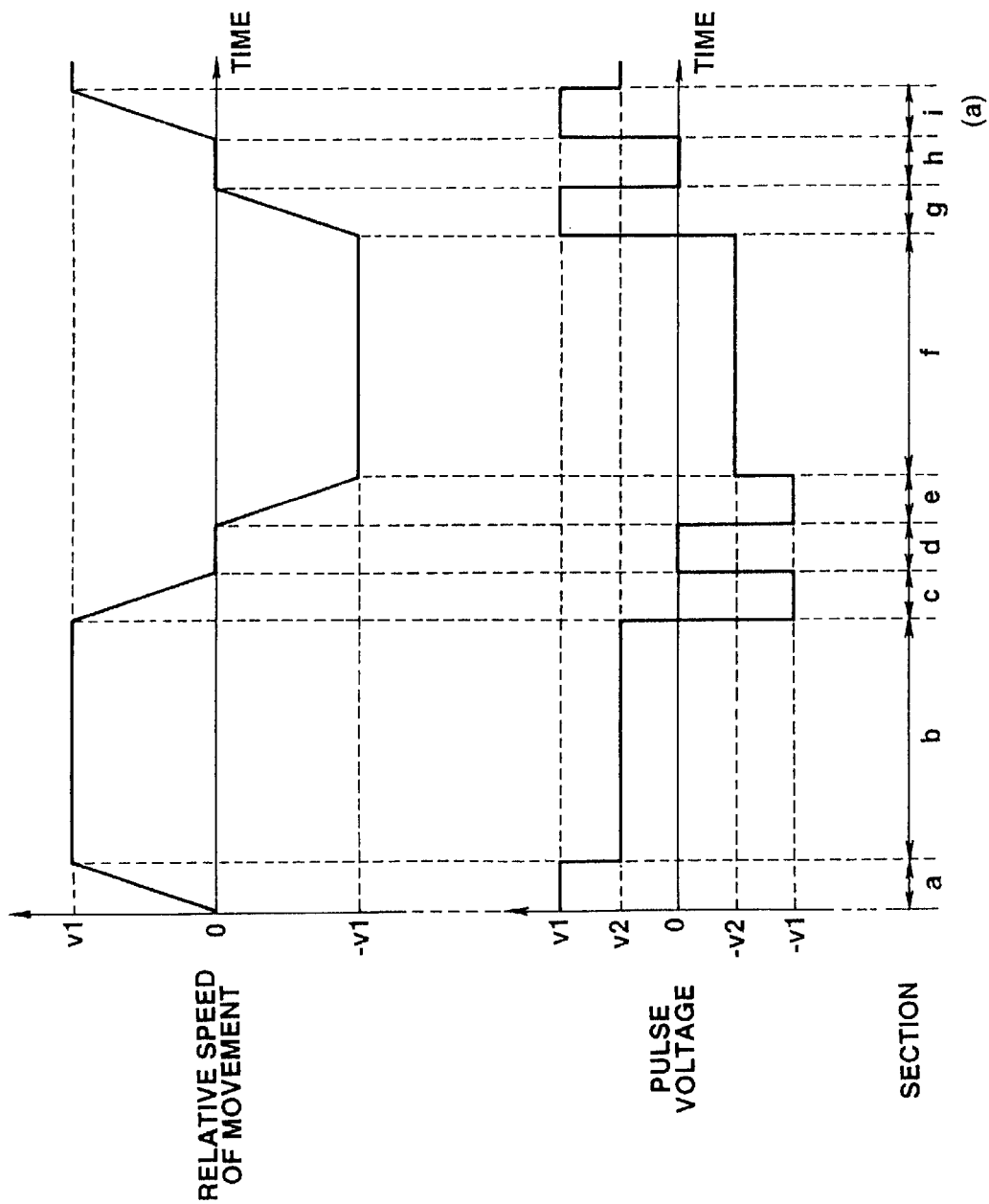
FIG. 10 is a diagram illustrating the relationship between the relative speed of movement of an optical card and time, and their relationship to pulse voltages applied by the optical information recording and reproduction device to an actuator driving an optical card.
Figure 11:
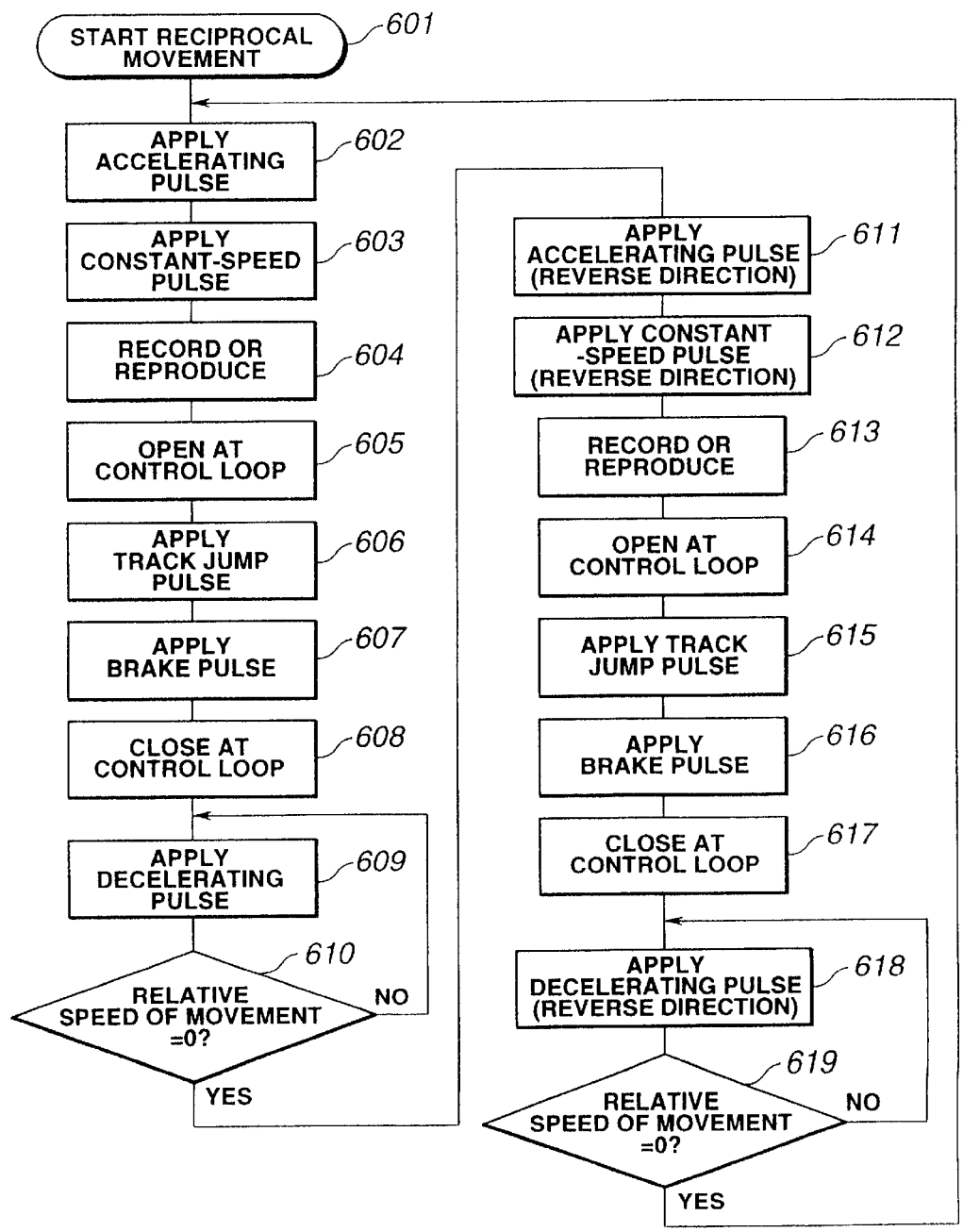
FIG. 11 is a flowchart showing the sequence of a track jump operation in an optical information recording and reproduction device according to a first conventional example.
Figure 12:
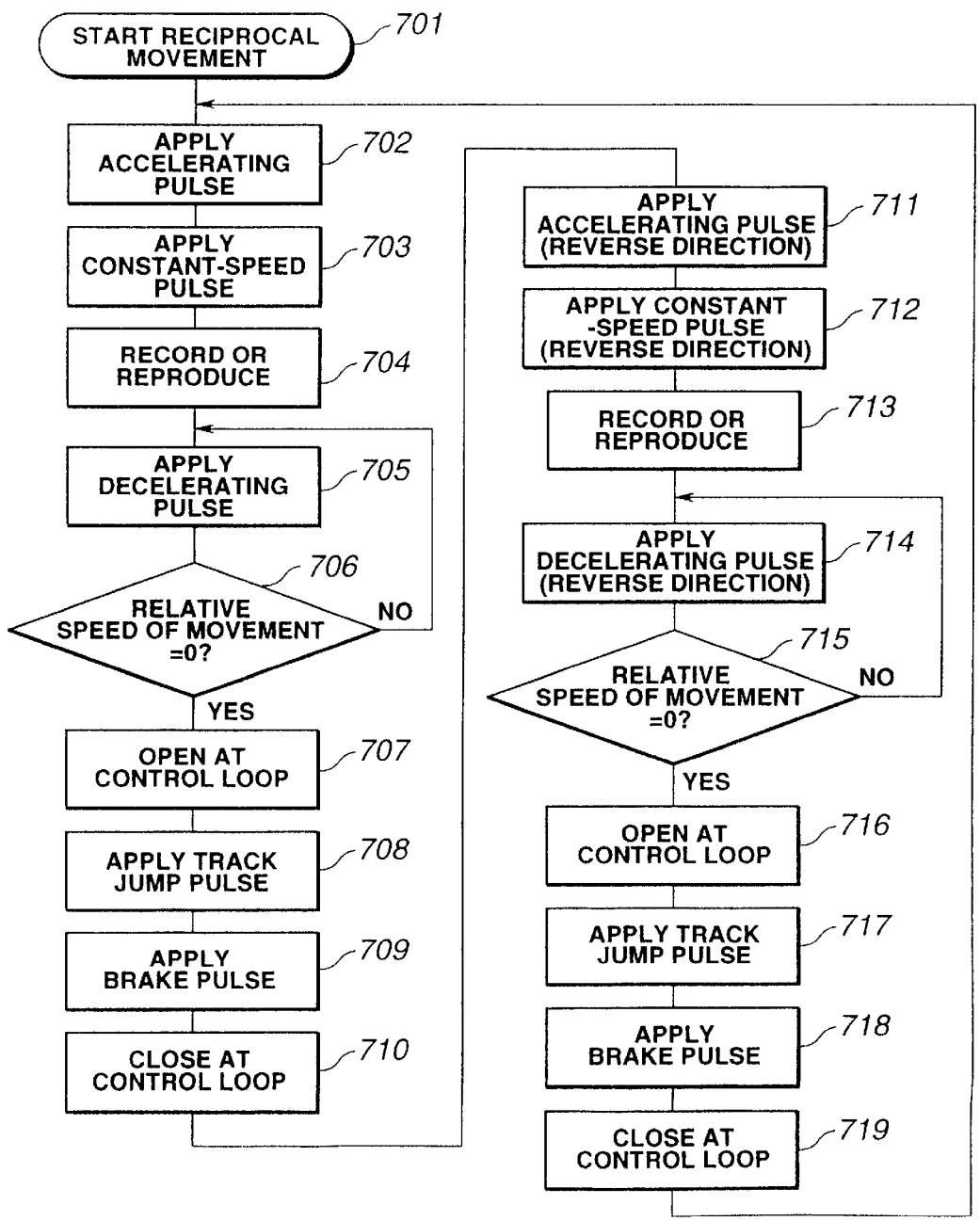
FIG. 12 is a flowchart showing the sequence of a track jump operation in an optical information recording and reproduction device according to a second conventional example.
Figure 13:
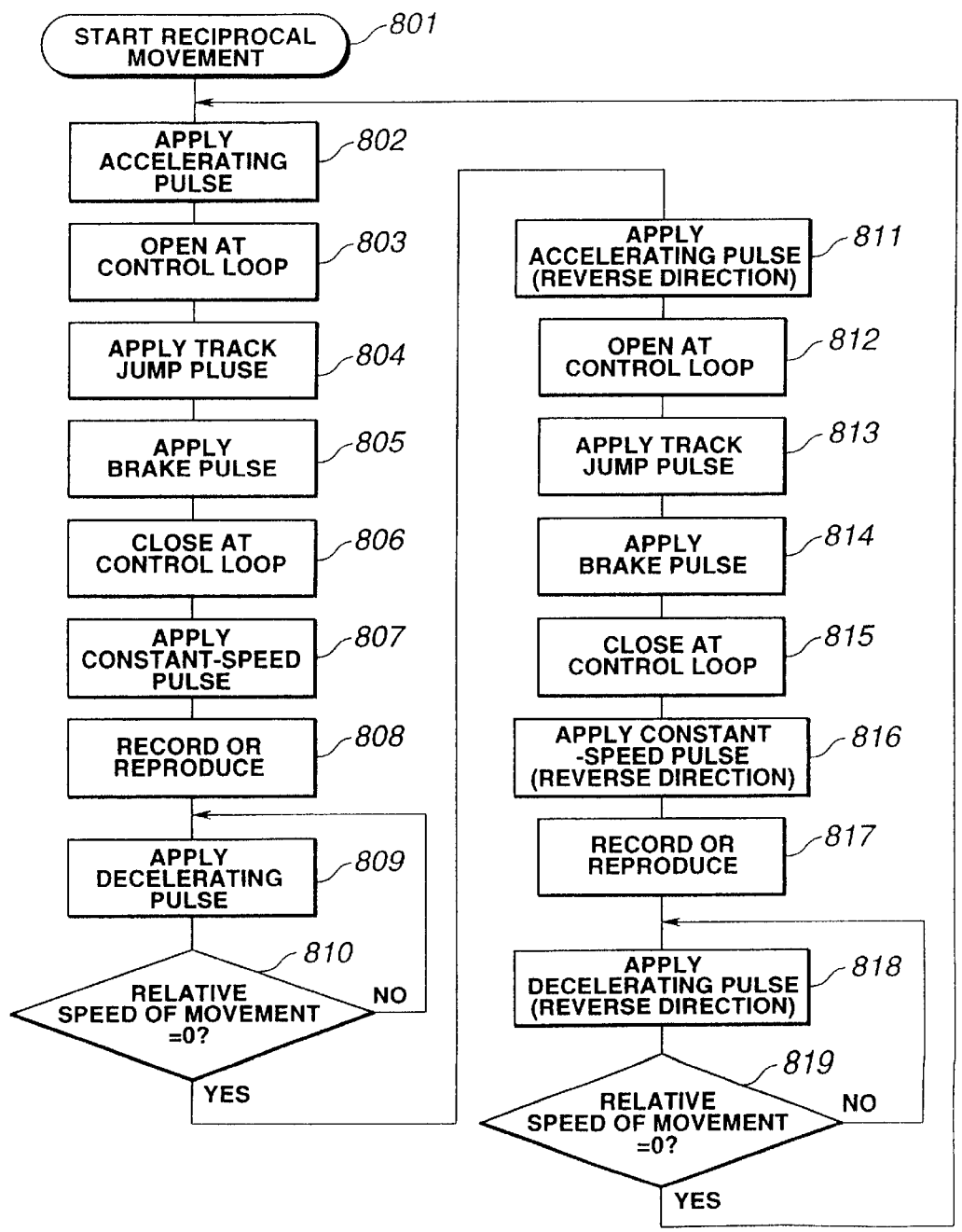
FIG. 13 is a flowchart showing the sequence of a track jump operation in an optical information recording and reproduction device according to a third conventional example.

FIG. 4 is a diagram illustrating the relative speed of movement and pulse voltages relating to the second embodiment, and FIG. 5 is a flowchart illustrating the sequence of a track jump operation in the second embodiment.

When the optical information recording and reproduction device 510 starts reciprocal movement of the optical card 500 (step 201 in FIG. 5), firstly, the MPU 512 applies an accelerating pulse (voltage V1) to the x direction drive motor 516, thereby accelerating the optical card 500 to a prescribed speed v1 (section a in FIG. 4, step 202), whereupon the MPU 512 applies a constant-speed pulse (voltage V2) to the x direction drive motor 516 (section b, step 203), and when the optical 500 has assumed a constant speed (section b, YES at step 204), the optical head 514 carries out information recording or reproduction (section b, step 205).

Furthermore, when the beam spot reaches a prescribed position on the optical card 500 due to the movement of the optical card 500, the MPU 512 applies a decelerating pulse (voltage −V1) to the x direction drive motor 516 (section c1, step 206), whereupon it applies a constant-speed pulse (voltage V3) to the x direction drive motor 516 (section c2, step 207), and when the optical card 500 has assumed a constant speed (section c2, YES at step 208), the AF/AT control circuit 518 opens the AT control loop (section c2, step 209) and the track jump circuit 517 applies a track jump pulse to the actuator 548 driving the object lens 545 (section c2, step 210).

Thereupon, the track jump circuit 517 applies a brake pulse to the actuator 548 such that the beam spot comes to rest over the desired information track 504 (section c2, step 211), and the AF/AT control circuit 518 then closes the AT control loop (section c2, step 212), the MPU 512 applies a decelerating pulse (voltage −V1) to the x direction drive motor 516, thereby decelerating the relative speed of movement of the optical card 500 until it reaches zero (section c3, step 213), and when the relative speed of movement of the optical card 500 has reached zero (section d, YES at step 214), the direction of movement of the optical card 500 is switched (section d, step 215).

Returning to step 202, the MPU 512 then applies an accelerating pulse (voltage −V1) to the x direction drive motor 516, thereby accelerating the optical card 500 to a prescribed speed–v1 (section e, step 202), whereupon it applies a constant-speed pulse (voltage –V2) to the x direction drive motor 516 (section f, step 203), and when the optical card 500 has reached a constant speed (section f, YES at step 204), the optical head 514 carries out information recording or reproduction (section f, step 205).

When the beam spot reaches a prescribed position on the optical card 500 due to the movement of the optical card 500, the MPU 512 applies a decelerating pulse (voltage V1) to the x direction drive motor 516 (section g1, step 206), whereupon it applies a constant-speed pulse (voltage –V3) to the x direction drive motor 516 (section g2, step 207), and when the optical card 500 has assumed a constant speed (section g2, YES at step 208), the AF/AT control circuit 518 opens the AT control loop (section g2, step 209) and the track jump circuit 517 applies a track jump pulse to the actuator 548 driving the object lens 545 (section g2, step 210).

Thereupon, the track jump circuit 517 applies a brake pulse to the actuator 548 such that the beam spot comes to rest over the desired information track 504 (section g2, step 211), and the AF/AT control circuit 518 then closes the AT control loop (section g2, step 212), the MPU 512 again applies a decelerating pulse (voltage V1) to the x direction drive motor 516, thereby decelerating the relative speed of movement of the optical card 500 until it reaches zero (section g3, step 213).

When the relative speed of movement of the optical card 500 has reached zero (section h, YES at step 214), the direction of movement of the optical card 500 is switched (section h, step 215), and the process returns to step 102.

By means of the operation described above, the optical card 500 completes a single reciprocal movement cycle, and this movement is continued as necessary, to record or reproduce information.

The time periods of sections a2, e2 in the first embodiment and sections c2, g2 in the second embodiment may be set to different times, for example, in cases where the device is jumping to an adjacent information track and cases where it is jumping to an information track several tracks apart, in response to the different times required for track jumping, or they may be set to fixed time periods.

Moreover, sections for implementing the track jump operation may be provided both in the acceleration region (a, e) and in the deceleration region (c, g), and track jumping may be performed in a step fashion in cases where the device is jumping to an information track several tracks apart.

What is claimed is:

1. An optical information recording and reproducing method in which there are provided an acceleration region where an optical head is relatively accelerated and moved with respect to a recording track of an optical information recording medium, a first constant-speed region where the optical head is relatively moved at a first constant speed with respect to the optical information recording medium following an end of the acceleration region, and a deceleration region where the optical head is relatively decelerated with respect to the optical information recording medium following an end of the first constant-speed region, wherein the method carries out information recording and reproduction with respect to the recording track while in the first constant-speed region, comprising the steps of:

providing a second constant-speed region within at least one of the acceleration region and the deceleration region where the optical head is moved relatively with respect to the optical information recording medium at a second constant speed; and implementing a jump operation wherein the optical head moves from a first recording and reproduction track to a second recording and reproduction track in the second constant-speed region.

2. The optical information recording and reproducing method according to claim 1, wherein the optical information-recording medium is an optical card.

3. The optical information recording and reproducing method according to claim 1, wherein a time period occupied by the second constant-speed region corresponds to a time period required for the jump operation.

4. An optical information recording and reproducing method for carrying out information recording and reproduction with respect to a recording track of an optical card by means of an optical head while moving the optical head relative to the optical card, comprising:

a first step of accelerating the optical card, with respect to the optical head, from an initial speed to a first constant speed;

a second step of moving the optical card parallel to the recording tracks at the first constant speed with respect to the optical head after the first step has been completed:

a third step of relatively moving the optical head, while moving the optical card at the first constant speed, in a direction perpendicular to the recording tracks thereby implementing a jump operation to jump from a first recording track to a second recording track;

a fourth step of accelerating the optical card with respect to the optical head to a second constant speed parallel to the recording tracks after movement at the first constant speed by has been completed;

a fifth step of moving the optical card at the second constant speed with respect to the optical head after the fourth step has been completed;

a sixth step of using the optical head for recording and reproducing information from the recording track during relative movement at the second constant speed; and a seventh step of decelerating the optical card from the second constant speed to the initial speed with respect to the optical head after the sixth step has been completed.

5. An optical information recording and reproducing method for carrying out information recording and reproduction with respect to a recording track of an optical card by means of an optical head, by moving the optical card relative to the optical head, comprising:

a first step of accelerating the optical card from an initial speed to a first constant speed with respect to the optical head;

a second step of moving the optical card at the first constant speed with respect to the optical head after the first step has been completed;

a third step of recording and reproducing, while moving at the first constant speed; a fourth step of decelerating the optical card to a second speed with respect to the optical head after movement at the first constant speed has been completed;

a fifth step of constantly moving the optical card at the second speed with respect to the optical head after the fourth step has been completed;

a sixth step of relatively moving, during the constant movement at the second speed, the optical card in a direction perpendicular to the recording track with respect to the optical head thereby implementing a jump operation for the recording and reproducing track to jump to another recording and reproducing track; and a seventh step of decelerating the optical card from the second constant speed to the initial speed with respect to the optical head after movement at the second constant speed has been completed.

6. An optical information recording and reproducing device provided with an acceleration region where an optical head is relatively accelerated and moved with respect to a recording track of an optical information recording medium, at a first constant-speed region where the optical head is relatively moved at a constant speed with respect to the optical information recording medium after end of the acceleration region, and a deceleration region where the optical head is relatively decelerated and moved with respect to the optical information recording medium after end of the first constant-speed region, and which carries out information recording and reproduction with respect to the recording track in the first constant-speed region, comprising:

movement control means for providing in the acceleration region a second constant-speed region wherein the optical head is relatively moved at a constant speed with respect to the optical information recording medium; and jump control means for implementing a jump operation by the optical head from a first recording and reproduction track to a second recording and reproduction track in the second constant-speed region.

7. The optical information recording and reproduction device according to claim 6, wherein the optical information-recording medium is an optical card.

8. The optical information recording and reproduction device according to claim 6, wherein the movement control means provides the second constant-speed region which corresponds to a time period required for the jump operation.

9. An optical information recording and reproducing device provided with an acceleration region where an optical head is relatively accelerated and moved with respect to a recording track of an optical information recording medium, a first constant-speed region where the optical head is relatively moved at a constant speed with respect to the optical information recording medium after end of the acceleration region, and a deceleration region where the optical head is relatively decelerated and moved with respect to the optical information recording medium after end of the first constant-speed region, and which carries out information recording and reproduction with respect to the recording track at the first constant-speed region, comprising:

movement control means for providing in the deceleration region a second constant-speed region where the optical head is relatively moved at a constant speed with respect to the optical information recording medium; and jump control means for implementing a jump operation from the recording and reproduction track to another recording and reproduction track by the optical head in the second constant-speed region controlled by the movement control means.

10. The optical information recording and reproduction device according to claim 9, wherein the optical information-recording medium is an optical card.

11. The optical information recording and reproduction device according to claim 9, wherein the movement control means provides the second constant-speed region to correspond with a time period required for the jump operation.

12. An optical information recording and reproducing device for carrying out information recording and reproduction with respect to a recording track of an optical card by means of an optical head, by moving the optical head relative to the optical card, comprising:

first acceleration movement control means for accelerating the optical card from an initial speed to a first speed with respect to the optical head;

first constant-speed movement control means for constantly moving the optical card at the first speed with respect to the optical head after the acceleration movement controlled by the first acceleration movement control means has been completed;

jump control means for relatively moving, during the constant movement of the optical card at the first speed controlled by the first acceleration movement control means, the optical head in a direction perpendicular to the recording and reproducing tracks to implement a jump operation to jump from a first recording and reproducing track to a second recording and reproducing track;

second acceleration movement control means for accelerating the optical card to a second speed with respect to the optical head after movement at the first speed controlled by the first constant-speed movement control means has been completed;

second constant-speed movement control means for constantly moving the optical card at the second speed with respect to the optical head after acceleration controlled by the second acceleration movement control means has been completed;

recording and reproducing means using the optical head for recording and reproducing, during the second speed controlled by the second constant-speed movement control means, information from the recording and reproducing track; and deceleration movement control means for decelerating the optical card from the second speed to the initial speed with respect to the optical head after movement at the second speed controlled by the second constant-speed movement control means has been completed.

13. An optical information recording and reproducing device for carrying out information recording and reproduction with a recording track of an optical card by means of an optical head, by moving the optical head relative to the optical card, comprising:

acceleration movement control means for accelerating the optical card from an initial speed to a first speed with respect to the optical head;

first constant-speed movement control means for constantly moving the optical card at the first speed with respect to the optical head after acceleration controlled by the acceleration movement control means has been completed;

recording and reproducing means for recording and reproducing information from the recording track by the optical head during constant movement at the first speed controlled by the first constant-speed movement control means;

first deceleration movement control means for decelerating the optical card to a second speed with respect to the optical head after movement at the first speed controlled by the first constant-speed movement control means has been completed;

second constant-speed movement control means for constantly moving the optical card at the second speed with respect to the optical head after deceleration controlled by the first deceleration movement control means has been completed;

jump control means for relatively moving, during movement at the second speed controlled by the second constant-speed movement control means, the optical card in a direction perpendicular to the recording tracks and implementing a jump operation for moving the optical head from a first recording track to a second recording track; and second deceleration movement control means for decelerating the optical card from the second speed to the initial speed with respect to the optical head after the constant movement at the second speed controlled by the second constant-speed movement control means has been completed.

* * * * *